United States Patent [19]

Cardenas

[11] Patent Number: 5,035,203
[45] Date of Patent: Jul. 30, 1991

[54] PET AUTOMOBILE SAFETY HARNESS

[75] Inventor: David Cardenas, 94-976 A Hanavna St., Waipahu, Hi. 96797

[73] Assignee: David Cardenas, Pearl City, Hi.

[21] Appl. No.: 521,189

[22] Filed: May 8, 1990

[51] Int. Cl.⁵ ............................................. A01K 29/00
[52] U.S. Cl. ...................................... 119/96; 119/106; 280/801
[58] Field of Search .................. 119/96, 106; 280/801, 280/808

[56] References Cited

U.S. PATENT DOCUMENTS 3,310,034  3/1967  Dishart .................................. 280/801
4,907,541  3/1990  Thompson ............................ 119/96

FOREIGN PATENT DOCUMENTS 1174917  9/1984  Canada .................................... 119/96

Primary Examiner—John G. Weiss
Attorney, Agent, or Firm—Michael Kroll

[57] ABSTRACT

A restraint for dogs and cats for the purpose of automobile travel. Constructed of webbing or leather harness with buckles and snaps. It restricts pet behavior while anchoring to safety belt.

11 Claims, 4 Drawing Sheets

PET AUTOMOBILE SAFETY HARNESS

BACKGROUND—FIELD OF INVENTION

This invention relates to pet harnesses, specifically to a harness which safely secures a pet to a car seat.

BACKGROUND—DESCRIPTION OF PRIOR ART

With increasing number of pets in the urban and suburban areas, people are more often traveling with pets in their cars. When driving the pets to the veternarian's office or to a family outing, there are many dangers. For example, a pet may insist on leaning far out of the window or sitting on the driver's lap thereby distracting the driver. In the event of an accident, the pet may become a torpedo causing serious damage to human and animal alike.

To keep the pet in their seat, people have held on to leashes or tied the leashes to the seat. However, these methods have many disadvantages. Leashes may "hang" the pet in case of an accident or its jumping out of the window. Also, it doesn't stop the pet from jumping on the driver's lap. Taking a hand off the steering wheel distracts the driver and may cause an accident. A 100, 30, or even a 10 pound pet cannot be safe from harm by either of these methods.

The Easy Rider Car Harness by Whitco (patent not found) is constructed by four main pieces: one strap around the neck, one strap around the chest area, a strap to connect these two along the chest and a fourth strap which connects the harness and seat belt. The disadvantage to the Easy Rider Car Harness is that it fits high on the neck and may cause damage to the neck in case of an accident or sudden stop.

OBJECTS AND ADVANTAGES

Accordingly, several objects and advantages of my invention are:

(a) to provide a harness which prevents the pets from distracting the driver;

(b) to provide a harness which restricts behavior that may inhibit the driver's concentration;

(c) to provide a harness which prevents the pet from hanging out of the car window;

(d) to provide a harness which prevents the pet from injuring other passengers in case of an accident or a sudden stop;

(e) to provide a harness which will not cause harm to the pet in case of an accident or sudden stop;

(f) to provide a harness which allows the driver full use of his body to drive safely;

(g) to provide a harness which comfortably holds the pet in the seat;

(h) to provide a harness which can be quickly released from the car in case of an emergency;

(i) to provide a harness which is adjustable to the size of the pet;

(j) to provide a harness which can be produced economically;

(k) to provide a harness which can be used in any automobile that has a safety belt (lap or 3- point);

(1) to provide a harness which is washable.

DRAWING FIGURES

In the drawings, each part has its own number. No dimensions are given because the harness will be made in several different sizes.

Figure 3:
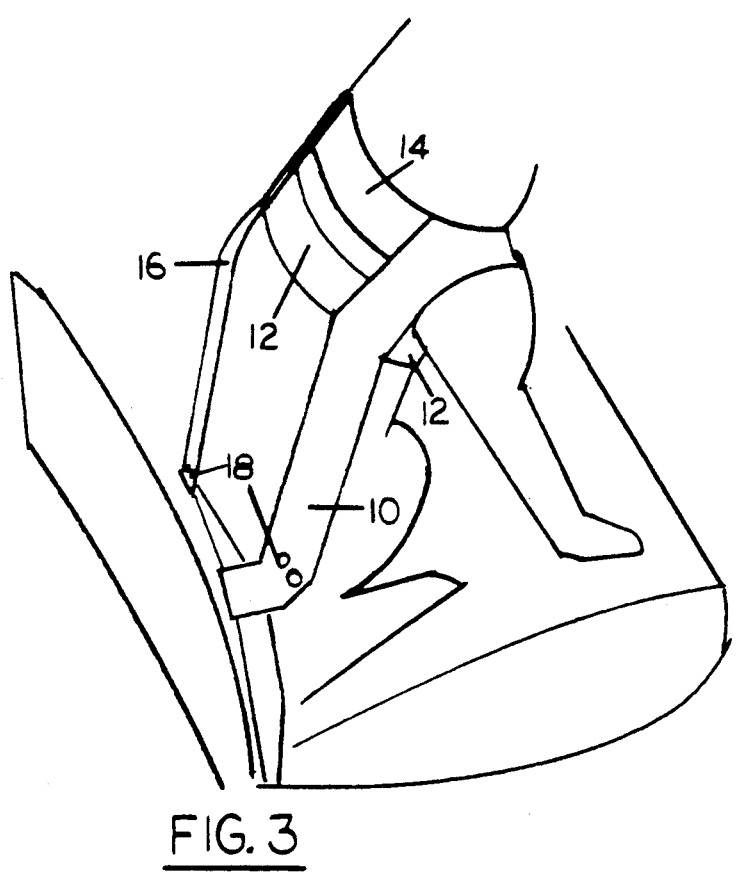

FIG. 3 shows a right side view with the pet in a harness. The seat and safety belt are also shown. Note the harness-to-safety-belt attachment.

Figure 4:
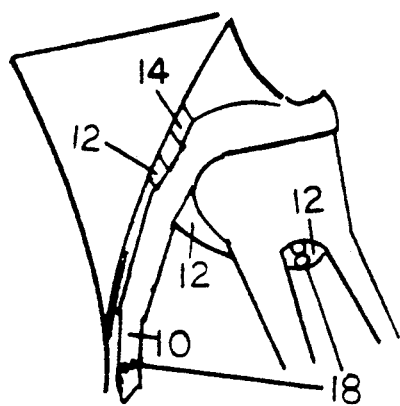

FIG. 4 is a front view with pet in harness.

Figure 5:
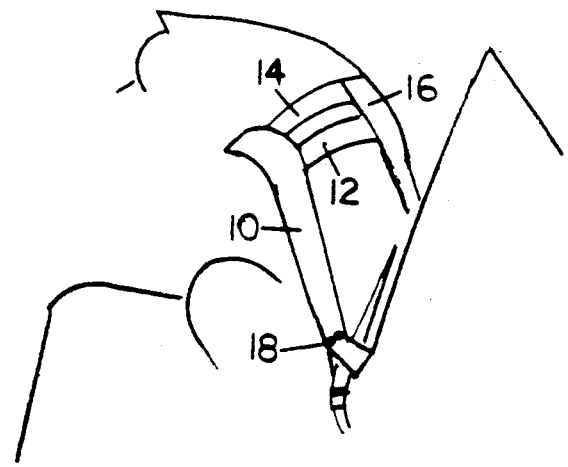

FIG. 5 is a left side view with pet in harness. The seat and safety belt are also shown. Note the harness-to-safety-belt attachment.

Figure 6:
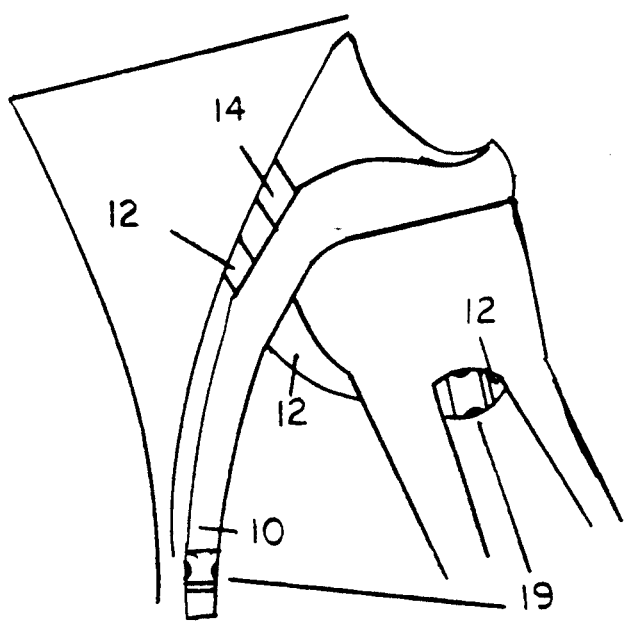

FIG. 6 is a front view with pet in harness useing buckles

REFERENCE NUMERALS IN DRAWINGS 10 body belt
12 chest support
14 shoulder support
16 back belt
18 snaps
19 buckles

Figure 1:
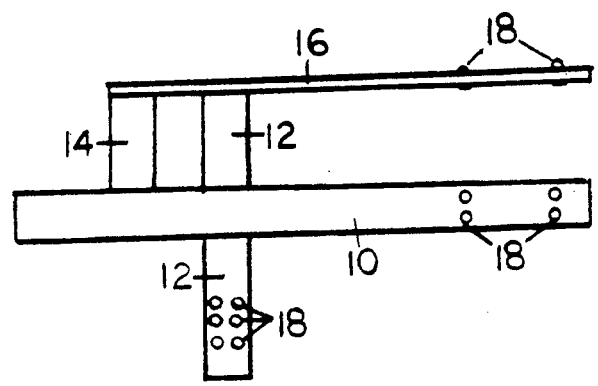
FIG. 1 shows a side view of the harness.
Figure 2:
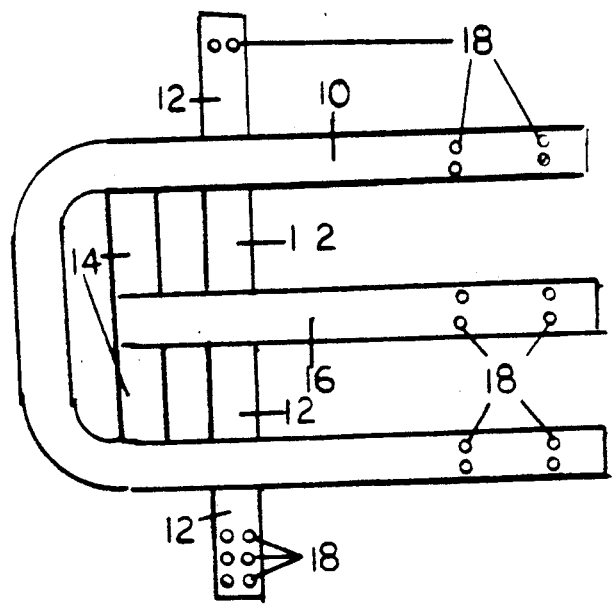
FIG. 2 shows a top view of harness laid out flat.

DESCRIPTION—FIGS. 1 to 2

A typical embodiment of the harness of the present invention is illustrated in FIG. 1 (side view) and FIG. 2 (top view). The harness has four main pieces 10, 12, 14 and 16 consisting of webbing which is soft and flexible, yet strong and durable. However, the harness can consist of any other material that can be flexible and durable such as leather.

Body belt 10 is sewn to chest support 12 and shoulder support 14 and has snaps or buckles on both ends.

Chest support 12 is sewn to body belt 10 and back belt 16 with snaps or buckles at both ends.

Shoulder support 14 is sewn to body belt 10 and back belt 16.

Back belt 16 is sewn to chest support 12 and shoulder support 14 with snaps or buckles on the end.

Attachments 18 are snaps.

Attachments 19 are buckles.

OPERATION—FIGS. 2, 3, 4, 5

Body belt 10 is the main support securing the pet on both sides and around the front minimizing movement left to right and forward. It would take up the most amount of stress in the event of an accident or sudden stop. As shown in FIGS. 3, 4, 5, and 6, it attaches to the safety belt with buckles 19 or snaps 18 at the ends.

Chest support 12 secures the harness to the pet. It attaches around the chest area with buckles 19 which can be adjusted to better fit the pet as seen in FIGS. 3 and 5.

Back belt 16 is secured to the seat belt over the back of the pet with buckles 19 or snaps 18. It restricts movement, forcing the pet to remain in a seated or prone position as shown in FIG. 3.

The snaps 18 and buckles 19 shown in FIG. 4 and 6 are used to attach belts 10 and 16 to the seat belt. They are also used to attach support 12 around the pet.

The harnes as a whole functions to secure the pet in the car seat. It keeps the pet in a seated or prone position. This is achieved by belt 16 being over the back of the pet and being shorter than the length of the pet.

The open coller area provided by belts 10 and 16 allows the pet easy breathing. Belt 10 rides low on the chest applying most of the stress to the rib cage avoiding damage to the throat.

Snaps 18 and buckles 19 allow for quick release and easy attachment.

SUMMARY, RAMIFICATIONS, AND SCOPE

The most important and best feature about the harness is simply SAFETY. The harness is a safety device that can be used in any car or truck with safety belts lap or three point. It helps to protect the pet in case of collision or sudden stop. It keeps the pet in its place to avoiding such hazards as the pet jumping on the driver's lap or falling out of the window.

It also can be released quickly in case of emergency. The pet safety harness is simple, economical, and has other advantages but most of all it may save a life.

I claim:

1. A pet vehicle safety harness for use with a standard lap or three point seat belt, comprising:
   (a) a body belt, said body belt being the main support securing the pet on both sides and front so that movement from left to right and forward is minimized, said body belt taking up most of the stress in the event of an accident or sudden stop of the vehicle, said body belt being removably mounted to the standard lap or the three point seat belt;
   (b) an adjustable chest support securing the harness to the pet;
   (c) adjusting means disposed on said chest support for adjusting said chest support for a proper fit of the harness on the pet;
   (d) a back belt having a length and being removably mounted to the standard lap or the three point seat belt, said back belt traversing over the back of the pet, said back belt restricting movement of the pet, said back belt restricting movement of the pet by being disposed over the back of the pet thereby forcing the pet to remain in a seat or prove position, said back belt being one homogeneous piece;
   (e) fastening means for removably attaching said back belt and said body belt to the standard lap or three point seat belt, said fastening means providing for quick release of the pet in case of an emergency; and
   (f) a shoulder support secured to said body belt and said back belt.

2. A harness as defined in claim 1, wherein said body belt and said back belt provide an open collar area so that the pet can breathe easier.

3. A harness as defined in claim 2, wherein said body belt is disposed low on the chest of the pet so that most of the stress is applied to the rib cage and avoiding damage to the throat.

4. A harness as defined in claim 2, wherein said body belt is sewn to said chest support and said shoulder support.

5. A harness as defined in claim 4, wherein said chest support is sewn to said body belt and said back belt.

6. A harness as defined in claim 5, wherein said shoulder support is sewn to said body belt and said back belt.

7. A harness as defined in claim 6, wherein said back belt is sewn to said chest support and said shoulder support.

8. A harness as defined in claim 1, wherein said adjusting means include a buckle.

9. A harness as defined in claim 1, wherein said fastening means include a snap.

10. A harness as defined in claim 1, wherein said body belt, said chest support, said shoulder support, said back belt are made of soft and flexible yet strong and durable webbing.

11. A harness as defined in claim 1, wherein said body belt, said chest support, said shoulder support, said back belt are made of soft and flexible yet strong and durable leather.

* * * * *